United States Patent
Sanyal

(10) Patent No.: US 6,652,786 B2
(45) Date of Patent: Nov. 25, 2003

(54) METHOD FOR MANUFACTURING COAXIAL WIRE WITH FOAMED INSULATION

(75) Inventor: Jeet Sanyal, Beaverton, OR (US)

(73) Assignee: Ludlow Company LP, Chicopee, MA (US)

( * ) Notice: Subject to any disclaimer, the term of this patent is extended or adjusted under 35 U.S.C. 154(b) by 101 days.

(21) Appl. No.: 09/782,108

(22) Filed: Feb. 13, 2001

(65) Prior Publication Data
US 2002/0109253 A1 Aug. 15, 2002

(51) Int. Cl.$^7$ ............................................... B29C 44/20
(52) U.S. Cl. .................... 264/45.9; 264/50; 264/46.7
(58) Field of Search ..................... 264/50, 45.9, 46.7

(56) References Cited

U.S. PATENT DOCUMENTS

| | | | |
|---|---|---|---|
| 3,882,209 A | * | 5/1975 | Yanagisawa et al. .......... 264/50 |
| 3,902,704 A | * | 9/1975 | Ishibashi et al. .............. 264/50 |
| 3,988,404 A | * | 10/1976 | Orimo et al. .................. 264/50 |
| 4,181,647 A | * | 1/1980 | Beach .......................... 264/50 |
| 4,182,734 A | * | 1/1980 | Takano et al. ................. 264/50 |
| 4,229,392 A | * | 10/1980 | Shimano et al. .............. 264/50 |
| 4,309,160 A | * | 1/1982 | Poutanen et al. ............. 264/50 |
| 4,547,328 A | * | 10/1985 | Yuto et al. ................... 264/45.9 |
| 5,158,986 A | | 10/1992 | Cha et al. |
| 5,334,356 A | | 8/1994 | Baldwin et al. |
| 5,866,053 A | | 2/1999 | Park et al. |
| 6,005,013 A | | 12/1999 | Suh et al. |
| 6,121,335 A | * | 9/2000 | Higashikubo et al. ........ 521/79 |

FOREIGN PATENT DOCUMENTS

| | | |
|---|---|---|
| CA | 2107355 | 7/1999 |
| JP | 70786/1993 | 10/1993 |
| JP | 2625576 | 4/1997 |
| WO | WO92/18069 | 10/1992 |
| WO | WO98/08667 | 3/1998 |
| WO | WO98/31521 | 7/1998 |
| WO | WO99/00313 | 1/1999 |
| WO | WO99/04968 | 2/1999 |
| WO | WO99/32543 | 7/1999 |
| WO | WO99/32544 | 7/1999 |
| WO | WO00/31170 | 6/2000 |

* cited by examiner

Primary Examiner—Allan R. Kuhns
(74) Attorney, Agent, or Firm—Langlotz Patent Works, Inc.; Bennet K. Langlotz

(57) ABSTRACT

A method of manufacturing wire from a conductor and a supply of thermoplastic insulating material. The method involves heating the insulating material, adding pressurized gas to the material, and extruding a sheath of the insulating material about the conductor to generate bubbles of the gas in the sheath. The method may operate by limiting the temperature of the material prior to extrusion, to increase viscosity to limit bubble expansion, and may provide a significant pressure drop on extrusion by limiting the gap between a wire-supplying guide and the extrusion die.

22 Claims, 3 Drawing Sheets

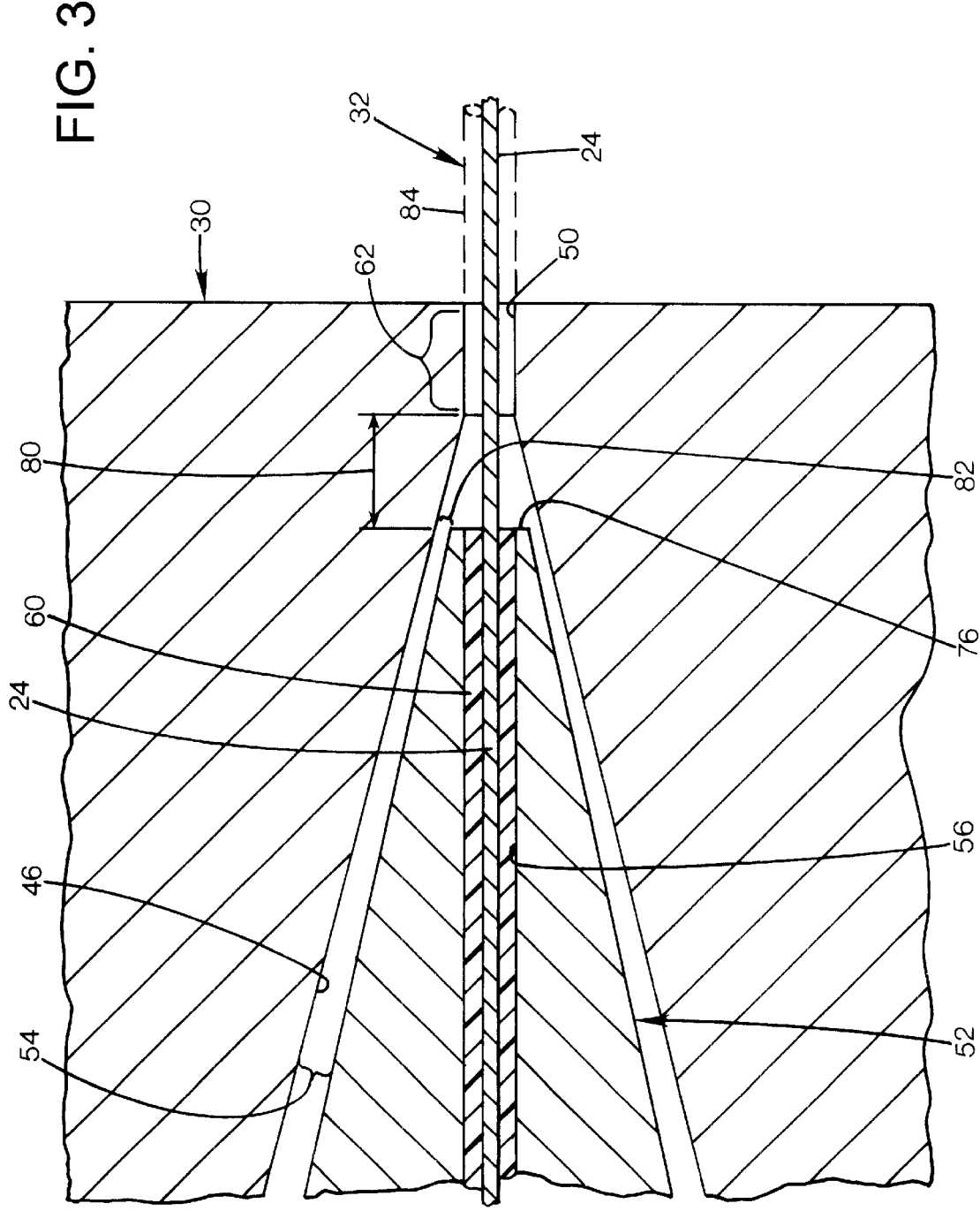

METHOD FOR MANUFACTURING COAXIAL WIRE WITH FOAMED INSULATION

FIELD OF THE INVENTION

This invention relates to wiring, and more particularly to small gauge coaxial wiring.

BACKGROUND AND SUMMARY OF THE INVENTION

Certain demanding applications require miniaturized multi-wire cable assemblies. To avoid undesirably bulky cables when substantial numbers of conductors are required, very fine conductors are used. To limit electrical noise and interference, coaxial wires having shielding are used for the conductors. A dielectric sheath surrounds a central conductor, and electrically separates it from the conductive shielding. The desired miniaturization of cables and coaxial wires is limited by the dielectric capabilities of the sheath, with conventional insulating materials having inadequate dielectric resistance below certain levels of miniaturization.

Advanced dielectric materials have improved dielectric qualities that permit a thinner sheath to perform adequately. Such materials include PTFE (e.g. Teflon®). Further advancements include modified materials such as PTFE tape that has been stretched to generate a porous film with improved dielectric qualities. Wire manufacturing methods provide additional dielectric capabilities by helically wrapping such tape in an overlapping manner to form air spaces. However, such materials are expensive, and such techniques are slow, difficult to control precisely, and costly.

For large scale manufacturing, improved dielectric qualities of thermoplastic material has been provided by "foaming" the plastic. This is done by dissolving gas in the molten plastic under pressure, then releasing the pressure to allow bubbles to form throughout the finished product. This is known to provide advantages of light weight, reduced material cost, lower capacitance (permitting faster signal speeds), and improved dielectric strength for a given thickness of material. However, these techniques have proven unsuitable for use in miniaturized applications. The size of a bubble limits the size of the product that may be usefully formed. When the bubble size approaches the wall thickness, unacceptable arcing is possible. Known foaming processes, particularly those that may have been used for coextrusion of wire insulation, generate bubbles larger than can be tolerated for small gauge wires used for coaxial components of miniaturized cable wire assemblies. With typical bubble sizes in the range of 0.004–0.008 inch, and a desired wall thickness of 2–10 times the normal bubble diameter, current foaming technologies are unsuitable for insulation of very small gauge wires with gauges less than 32.

The present invention overcomes the limitations of the prior art by providing a method of manufacturing wire from a conductor and a supply of thermoplastic insulating material. The method involves heating the insulating material, adding pressurized gas to the material, and extruding a sheath of the insulating material about the conductor to generate bubbles of the gas in the sheath. The method may operate by limiting the temperature of the material prior to extrusion, to increase viscosity to limit bubble expansion, and may provide a significant pressure drop on extrusion by limiting the gap between a wire-supplying guide and the extrusion die.

BRIEF DESCRIPTION OF THE DRAWINGS

FIG. 3 is an enlarged sectional view of an extrusion head according to the embodiment of FIG. 1.

DETAILED DESCRIPTION OF A PREFERRED EMBODIMENT

Figure 1:
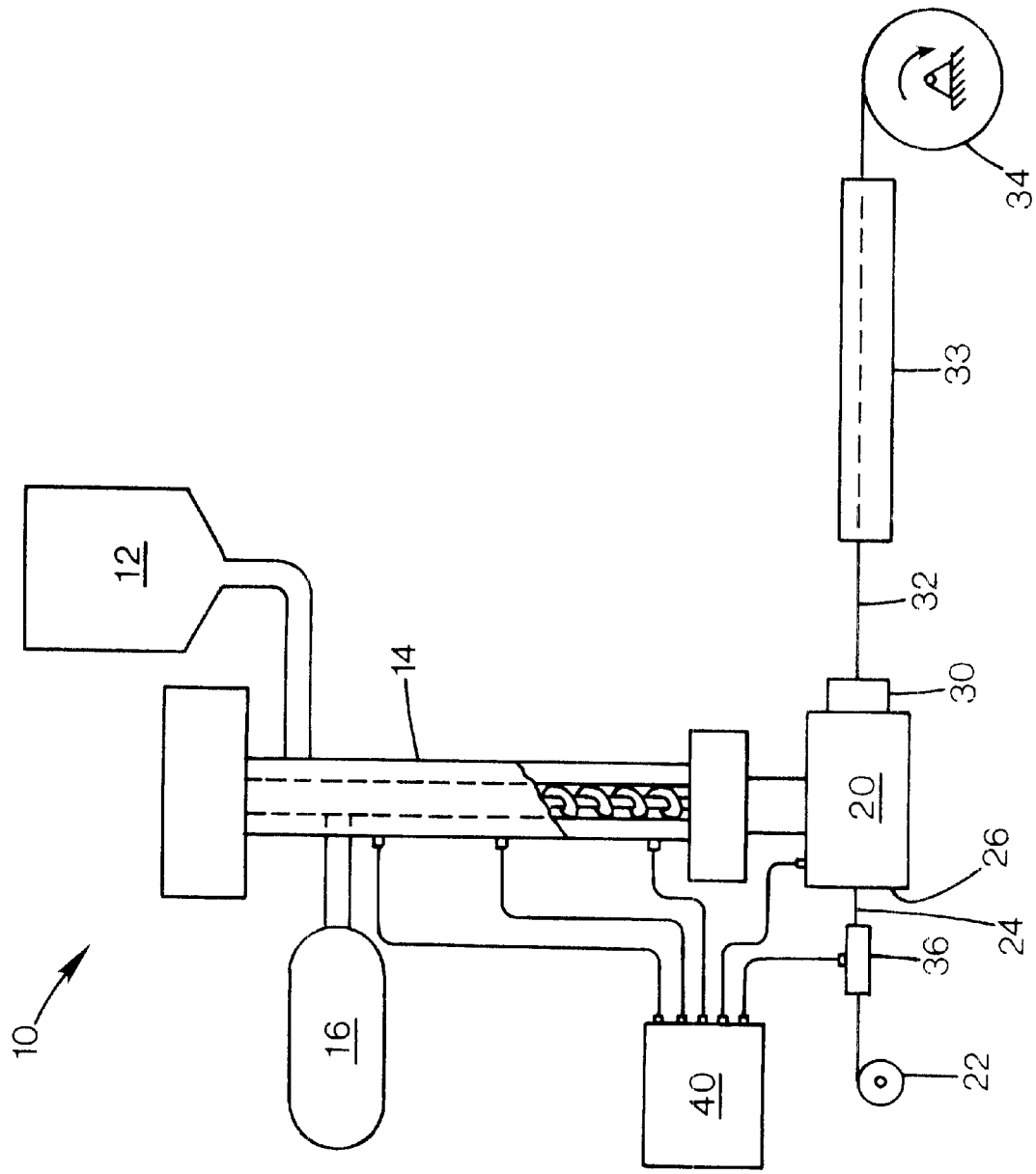
FIG. 1 is a simplified schematic view of an extrusion system according to a preferred embodiment of the invention.

FIG. 1 shows a wire sheathing extrusion system 10. The system has a plastic supply hopper 12, an extruder 14, a pressurized gas supply 16 connected to the extruder, and a crosshead assembly 20. A wire supply reel 22 supplies a strand of conductive wire 24 to the cross head 20 from an entry face aperture 26. A die 30 is attached to the opposite end of the crosshead, and defines an aperture through which sheathed wire 32 exits, passing through a cooling trough 33 filled with water, and collected by a take up reel 34. The wire 24 passes through a preheater 36 prior to entry into the crosshead. An electronic controller and heater system 40 is connected to multiple locations throughout the system to monitor and control the temperature of the system and material passing through the system.

The hopper 12 contains a supply of plastic pellets, preferably of TPX or polymethylpentene material available from Mitsui Plastics of Japan. Any thermoplastic material may be employed, although those related to polyolefins such as polyethylene and polypropylene are found to be suitable alternatives. The preferred material has a glass transition temperature of 84° F., and a melting point of 440 °.

The extruder 14 defines an elongated bore in which a rotatable helical screw resides. An entry port at one end connects to the hopper, and an exit port at the opposite end connects to the cross head 20. The screw is configured to provide increasing feed pressure as material progresses toward the cross head. To provide thorough melting and mixing of the material, the bore must have adequate length, particularly in relation to the diameter. Preferably, the chamber has a length at least 36 times its diameter. In the preferred embodiment, the bore diameter is ¾ inch, and a total net bore length of 40 inches is used.

The gas injection system 16 has a gas line connected to the extruder bore, so that the plastic material is exposed to the gas under pressure. Preferably, the gas is $CO_2$, although alternative gases such as $N_2$ may suitably be employed. The gas is injected into the extruder bore at a pressure of 3000–8000 psi, through a port at a position where the plastic material is heated to a temperature of 575° F. At this temperature, and with the mixing as the material progresses along the extruder, the gas becomes dissolved in the melt, particularly as the pressure generated in the material by the compressive action of the extruder screw increases along the length of the extruder. Such pressure is preferably about 500 psi higher at the cross head than at the gas injection point in the barrel.

Figure 2:
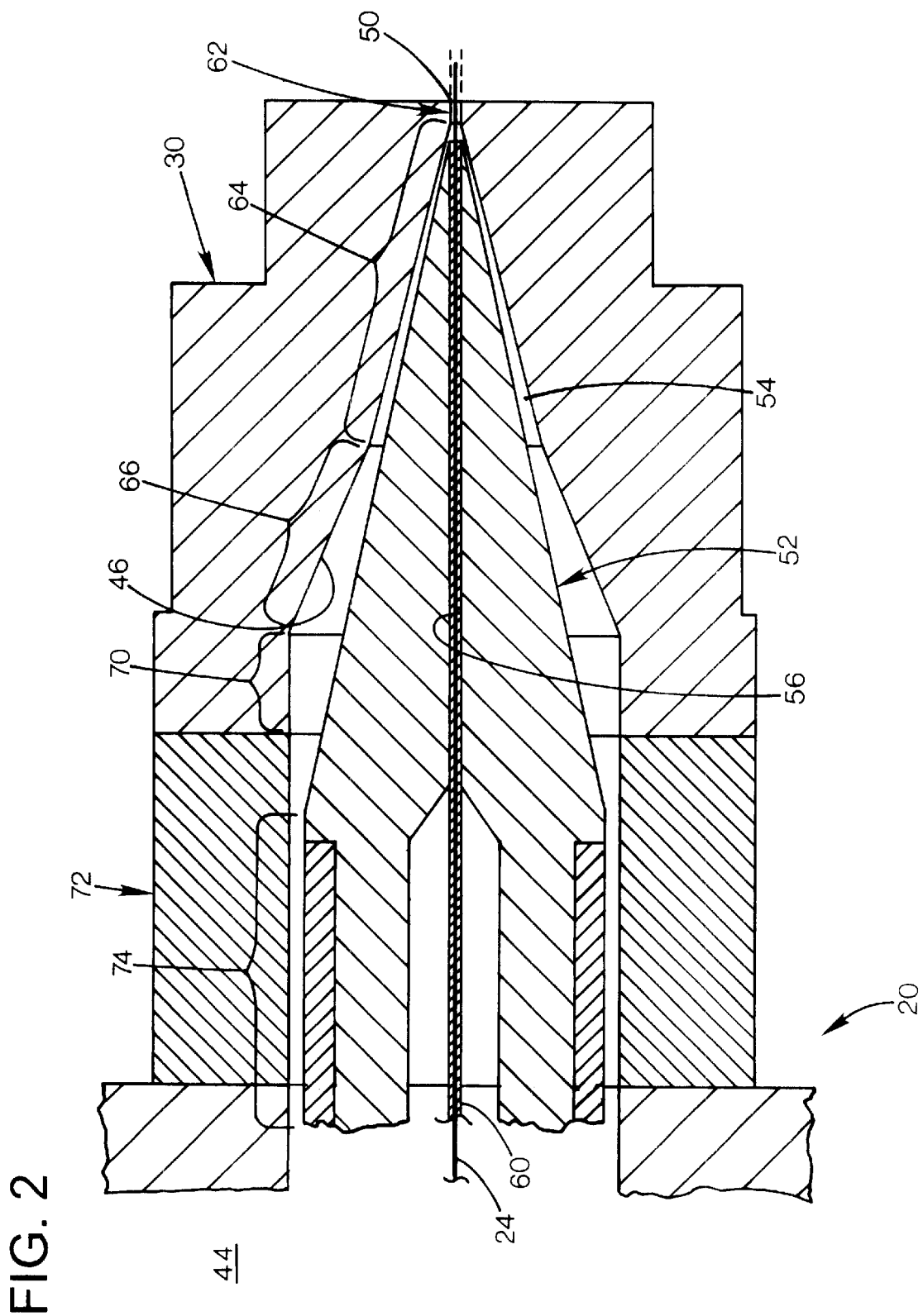
FIG. 2 is sectional view of an extrusion head according to the embodiment of FIG. 1.

FIG. 2 shows a portion of the cross head 20 and die 30. The cross head defines a chamber 44 into which material enters from the extruder. The die extends from the cross head, and defines a tapering bore 46 having a large diameter where material enters from the chamber, and tapering to a small aperture 50 at the free end of the die. A wire guide 52 is a conical elongated member received in the bore, and having a greater taper angle than the bore, so that a conical gap 54 between the guide and die narrows toward the aperture 50. The guide defines a central wire guide bore 56 that closely receives a wire guide sleeve 60 defining a central bore sized to receive the conductor, and to permit the conductor to slide axially within the sleeve. Preferably, the sleeve is fabricated of stainless steel.

Referring now to FIG. 3, the guide has a nose surface 76 that is spaced apart axially from the inner core of the die (i.e. the shut off point) by a gap 80. This gap may be known as the "gum space." In conventional extrusion processes (including those used for foamed extrusion of wire coating), the gum space gap is at least about 0.100 inch or greater. It has been generally believed that to reduce this spacing appreciably, would lead to certain disadvantageous results such as a non-circular cross section and lack of concentricity between the conductor and dielectric. In contrast, this space is less than 0.100 inch in the preferred embodiment, which yields good results contrary to conventional expectations.

In the position shown, the nose 76 of the guide defines a small annular gap 82 with respect to the adjacent portion of the die bore surface 46. Thus, the gap has the smallest cross sectional area of any portion of the path that the extruded material follows, and thus the point behind which the highest pressure is generated. Between the smallest gap and the end of the gum space, a typical percentage pressure drop of 90% causes dissolved or entrained gas bubbles to expand. In a preferred embodiment, the gap 82 has a width of less than 0.02 inches and has a width of less than 2.5 times the diameter of conductor 24.

As the foamed material passes through the gum space 80 beyond the gap 82, the remaining taper of the chamber slightly compresses the material to provide a relatively dense uniform exterior sheathing surface. The diameter of the finished sheathing is further controlled as the wire passes through the cylindrical exit bore 62, which provides a constant diameter to stabilize the material as it cools slightly prior to exiting. Upon exiting to atmospheric pressure, the material slightly expands, so that the final sheathing diameter is only about 10% greater than the exit bore diameter.

Preferably, material is 40–55° F. below the unfoamed material's melting point. The outlet temperature is well below the 500° F. temperature normally recommended for extrusion. Such normal temperatures are recommended because of stable output and correct material viacosity for unfoamed TPX. However, setting the outlet temperature at the much lower temperature provides a more viscous plastic material that does not readily stretch or permit bubbles to expand when it passes from the high pressure state within the cross head to the low atmospheric pressure outside of the cross head. While cross head exit temperatures of 40–55° F. below the material's melting point are preferred, this temperature difference may fall in the range of 20–40° F. and permit the invention to operate adequately.

The extruded sheath material 84 contains 45–65% gas bubbles by volume, limiting the weight and density of the material proportionately. For preferred TPX or poly methyl pentene material having a dielectric constant of 2.12 in the unfoamed state, the foamed sheathing has an improved dielectric constant of 1.35. The bubbles formed have a mean diameter of 10–20 microns, with about 1 billion bubbles per cubic centimeter, in contrast to conventional techniques, which generate bubble diameters of greater than 100 microns.

For sheathing of a 32-gauge wire as in the preferred embodiment, a sheathing wall thickness of 0.006 inch is provided, which is 10 times the mean bubble diameter. This factor is preferably greater than 5 times, to ensure against arcing by a portion of conductor exposed when a bubble size exceeds the wall thickness, as can occur when existing processes are applied to miniaturized wires. In the preferred embodiment, the sheathed wire is covered with another conductor that serves as a shield, which in turn may be covered by additional insulation to isolate the shielding from contacting the shielding of other wires in a cable bundle.

While the above is discussed in terms of preferred and alternative embodiments, the invention is not intended to be so limited.

What is claimed is:

1. A method of manufacturing wire comprising:

providing a conductor;

providing a supply of thermoplastic insulating material;

heating the insulating material;

adding pressurized gas to the material;

extruding a sheath of the insulating material about the conductor;

extruding a sheath including passing the conductor through a central bore defined by a guide having a nose, positioning the nose a limited distance from a die defining a passage through which the conductor passes, such that the die and the nose define a first gap;

extruding a sheath further including passing the conductor through an outlet bore defining a second gap with respect to the conductor; and while passing the insulating material through the first gap, generating bubbles of the gas in the sheath.

2. The method of claim 1 wherein heating the insulating material includes limiting the temperature to less than a preselected threshold prior to extruding the sheath.

3. The method of claim 2 wherein the insulating material has a melting point, and the preselected threshold is at least 140° F. below the material melting point.

4. The method of claim 2 wherein the insulating material has a glass transition temperature, and wherein the threshold is limited to less than 316° F. above the glass transition temperature.

5. The method of claim 1 including mixing the material after adding pressurized gas in an extrusion screw facility having a length at least 36 times its diameter.

6. The method of claim 1 wherein the insulating material is a polyolefin material.

7. The method of claim 1 wherein the insulating material is poly methyl pentene.

8. The method of claim 1 wherein the gas is carbon dioxide.

9. The method of claim 1 wherein the gas in nitrogen.

10. The method of claim 1 wherein the bubbles have diameters less than 0.002 inch.

11. The method of claim 1 wherein the sheath has a thickness of less than 0.008 inch.

12. The method of claim 1 wherein the bubbles have diameters between 0.5 and 0.10 times the thickness of the sheath.

13. The method of claim 1 wherein the first gap has a width of less than 2.5 times the diameter of the conductor.

14. The method of claim 1 including reducing the pressure of the material as passes through the first gap.

15. The method of claim 14 wherein the pressure reduction across the first gap is greater than 90%.

16. The method of claim 1 wherein the outlet bore has a length at least 2 times the diameter of the bore.

17. The method of claim 1 including increasing the viscosity of the material after the gas has been added.

18. The method of claim 17 wherein increasing the viscosity includes decreasing the temperature.

19. The method of claim 14 wherein the pressure drop within the material across the first gap is substantially greater than the pressure drop across the second gap.

20. The method of claim 1 wherein the first gap is an annular gap.

21. The method of claim 1 wherein the first gap has a width of less than 0.020 inch.

22. The method of claim 21 wherein the first gap has a width of less than 2.5 times the diameter of the conductor.

* * * * *